(12) United States Patent
Zhu et al.

(10) Patent No.: US 12,302,160 B2
(45) Date of Patent: May 13, 2025

(54) METHOD AND DEVICE OF COORDINATING TRANSMISSION TIME OF V2X MESSAGE

(71) Applicant: DENSO CORPORATION, Kariya (JP)

(72) Inventors: Jian Zhu, Shanghai (CN); Yueqi Song, Shanghai (CN)

(73) Assignee: DENSO CORPORATION, Kariya (JP)

( * ) Notice: Subject to any disclaimer, the term of this patent is extended or adjusted under 35 U.S.C. 154(b) by 357 days.

(21) Appl. No.: 17/839,596

(22) Filed: Jun. 14, 2022

(65) Prior Publication Data

US 2023/0007525 A1 Jan. 5, 2023

(30) Foreign Application Priority Data

Jun. 30, 2021 (CN) .................... 2021 10731782.6

(51) Int. Cl.
  *H04W 28/02* (2009.01)
  *H04W 4/40* (2018.01)
  *H04W 80/12* (2009.01)

(52) U.S. Cl.
  CPC ......... *H04W 28/0215* (2013.01); *H04W 4/40* (2018.02); *H04W 80/12* (2013.01)

(58) Field of Classification Search
  CPC ... H04W 4/40; H04W 28/0215; H04W 80/12; H04W 4/06; H04W 4/12
  See application file for complete search history.

(56) References Cited

U.S. PATENT DOCUMENTS

2022/0191050 A1* 6/2022 Melkote Krishnaprasad ............. H04W 76/22

* cited by examiner

*Primary Examiner* — Diane D Mizrahi
(74) *Attorney, Agent, or Firm* — Harness, Dickey & Pierce, P.L.C.

(57) ABSTRACT

A method of coordinating a transmission time of V2X message includes: acquiring, by an application layer module of a V2X device, an ideal time point at which an underlying layer module of the V2X device schedules to transmit the V2X message, the application layer module being configured to manage V2X application scenario and the underlying layer module being configured to manage V2X radio frequency function; determining a processing period for processing the V2X message; determining a waiting period based on the ideal time point and the processing period; transmitting, from the application layer module to the underlying layer module, a message transmission request after elapse of the waiting period from acquiring of the ideal time point; and in response to a reception of the message transmission request in the underlying layer module, transmitting, using the underlying layer module, the V2X message toward outside at the ideal time point.

21 Claims, 5 Drawing Sheets

METHOD AND DEVICE OF COORDINATING TRANSMISSION TIME OF V2X MESSAGE

CROSS REFERENCE TO RELATED APPLICATION

The present application claims the benefit of priority from Chinese Patent Application No. 202110731782.6 filed on Jun. 30, 2021. The entire disclosure of the above application is incorporated herein by reference.

TECHNICAL FIELD

The present disclosure relates to a vehicle-to everything (V2X) communication, and particularly relates to a method and a device of coordinating transmission time of V2X message.

BACKGROUND

There has been known V2X systems, such as a cellular vehicle to everything (C-V2X) system, which is used to broadcast periodic service data toward outside.

SUMMARY

A method of coordinating a transmission time of a vehicle-to-everything (V2X) message includes: acquiring, by an application layer module of a V2X device, an ideal time point at which an underlying layer module of the V2X device schedules to transmit the V2X message toward outside, the application layer module being configured to manage a V2X application scenario and the underlying layer module being configured to manage a V2X radio frequency function; determining a processing period required by the V2X device to process the V2X message; determining a waiting period based on the ideal time point and the processing period; transmitting, from the application layer module to the underlying layer module, a message transmission request after elapse of the waiting period from acquiring of the ideal time point; and in response to a reception of the message transmission request in the underlying layer module, transmitting, using the underlying layer module, the V2X message toward outside at the ideal time point.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
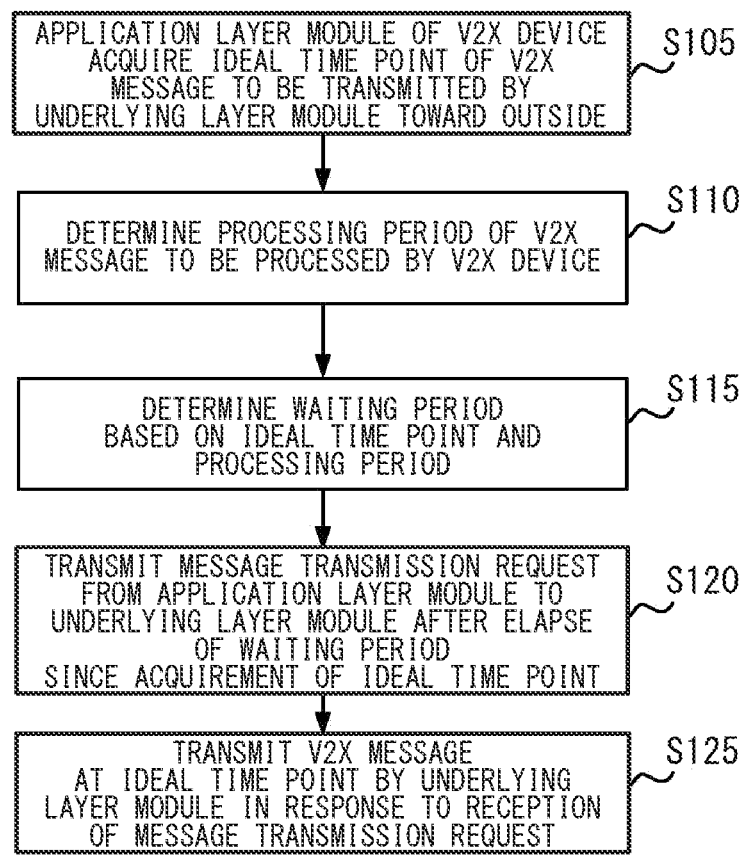
FIG. 1 is a flowchart showing an example of a method of coordinating a transmission time of V2X message according to the present disclosure.

In V2X systems, such as a cellular vehicle to everything (C-V2X) system, there are applications that broadcast periodic service data. For example, as the periodic service data, Basic Safety Message (BSM), map, Signal Phase and Timing (SPAT, traffic light phase and timing) message, or the like are broadcasted periodically. Hereinafter, these kinds of messages are collectively referred to as V2X message. For example, regular BSM data of own vehicle will be broadcasted at a fixed frequency (for example, 10 Hz) in the absence of an emergency trigger. However, due to the limited channel resource, the C-V2X system considers the factors of V2X periodic service data in the design and provides a semi-persistent scheduling (SPS) communication method in order to optimize allocation of channel resource. In the SPS communication method, the C-V2X system reserves channel resource in the network based on the broadcasting period of service data. However, in an actual application, an operation related to the SPS is executed in an underlying layer module that manages V2X radio frequency function, and an operation related to the V2X service is executed in an application layer module that manages the V2X application scenario. When the application layer module requests the underlying layer module to transmit the BSM service data, the underlying layer module does not immediately respond to the data transmission request from the application layer module due to a reason that, for example, the underlying layer module needs to wait for an activation of the reserved resource. The application layer module has no information about the resource reservation performed by the underlying layer module. Thus, when the application layer module transmits the service request at a strictly fixed frequency of, for example, 10 Hz, the underlying layer module may receive the message transmission request too early or the message transmission request may miss the reserved resource, thereby the data transmission by the underlying layer module may be delayed. For example, when the unit that performs BSM packaging in the application layer module is blocked, or the timer accuracy is insufficient, or the transmission by the underlying layer module is blocked or delayed, it is easy to miss the reserved channel resource. This may cause an increase or decrease in the actual transmission delay time of the BSM. Thus, the communication fails to satisfy low latency and high frequency requirement defined under the C-V2X standard, and may further affect proper operation of C-V2X security application.

The following will give a brief description of one or more aspects of the present disclosure to provide a basic understanding of the present disclosure. This brief description is not an exhaustive overview of all contemplated aspects and is neither intended to identify key or critical elements of all aspects nor attempt to delineate the scope of any or all aspects. Its sole purpose is to describe some concepts of one or more aspects in a simplified form as a prelude to the more detailed description that will be described later.

The present disclosure provides a method of coordinating a transmission time of vehicle-to-everything (V2X) message. The method includes: acquiring, by an application layer module of a V2X device, an ideal time point at which an underlying layer module of the V2X device schedules to transmit the V2X message toward outside, the application layer module being configured to manage a V2X application scenario and the underlying layer module being configured to manage a V2X radio frequency function; determining a processing period required by the V2X device to process the V2X message; determining a waiting period based on the ideal time point and the processing period; transmitting, from the application layer module to the underlying layer module, a message transmission request after elapse of the waiting period from acquiring of the ideal time point; and in response to a reception of the message transmission request in the underlying layer module, transmitting, using the underlying layer module, the V2X message toward outside at the ideal time point.

In one embodiment, in the transmitting of the message transmission request from the application layer module to the underlying layer module, the application layer module prepares the V2X message and transmits the prepared V2X message to the underlying layer module together with the message transmission request.

In one embodiment, the ideal time point occurs at an expected period set by the application layer module, and in the acquiring of the ideal time point by the application layer module: in response to the ideal time point deviating from the expected period, the underlying layer module notifies the application layer module of a first ideal time point determined after detection of the deviation; and the application layer module determines, by calculation, each ideal time point after the first ideal time point until the ideal time point deviates from the expected period again or the expected period is changed by the application layer module.

In one embodiment, the ideal time point occurs at an expected period set by the application layer module, and in the acquiring of the ideal time point by the application layer module: in response to the expected period being changed by the application layer module, the underlying layer module notifies the application layer module of a first ideal time point determined after change of the expected period; and the application layer module determines, by calculation, each ideal time point after the first ideal time point until the expected period is changed again by the application layer module or the ideal time point deviates from the expected period.

In one embodiment, the waiting period M1 is determined by a formula $M1=(T1-T0)-M2$, when $M2<T1-T0$, $M1=(T1-T0)-M2$, when $M2 \geq T1-T0$, $M1=0$, wherein M1 represents the waiting period, T1 represents the ideal time point, T0 represents a time point at which the application layer module acquires the ideal time point T1, and M2 represents the processing period.

In one embodiment, the processing period M2 is set to a fixed value.

In one embodiment, the processing period M2 is set to a dynamic value, and the determining of the processing period M2 includes dynamically determining the processing period based on a busy level P1 of the application layer module and a busy level P2 of the underlying layer module.

In one embodiment, the busy level P1 depends on a processing load CPU1 of the application layer module, the busy level P2 depends on a processing load CPU2 of the underlying layer module, and the processing period M2 is determined by a formula: $M2=(P1(CPU1)+P2(CPU2)+M3)$, wherein M3 represents a sum of time periods except the busy level P1 of the application layer module and the busy level P2 of the underlying layer module.

In one embodiment, the processing period M2 is set to a dynamic value, and the determining of the processing period M2 includes dynamically determining the processing period M2 based on busy levels of multiple sub-modules of the application layer module and busy levels of multiple sub-modules of the underlying layer module.

In one embodiment, the processing period M2 is determined by a formula:
$M2=(P11(CPU11)+P12(CPU12)+ \ldots +P1N(CPU1N)+P21(CPU21)+P22(CPU22)+ \ldots +P2L(CPU2L)+M4)$,
wherein, CPU11, CPU12, ... CPU1N represent processing loads of corresponding sub-modules of the application layer module, CPU21, CPU22, ... CPU2L represent processing loads of corresponding sub-modules of the underlying layer module, P11, P12, ... P1N represent busy levels of corresponding sub-modules of the application layer module, P21, P22, ... P2L represent busy levels of corresponding sub-modules of the underlying layer module, M4 represent a sum of time periods except the busy levels of the multiple sub-modules of the application layer module and the busy levels of the multiple sub-modules of the underlying layer module, and N and L are integers equal to or greater than 2.

The present disclosure provides a device of coordinating a transmission time of a vehicle-to-everything (V2X) message, and the device includes: a memory; and a processor coupled to the memory. The processor is configured to: acquire, by an application layer module of a V2X device, an ideal time point at which an underlying layer module of the V2X device schedules to transmit the V2X message toward outside, the application layer module being configured to manage a V2X application scenario and the underlying layer module being configured to manage a V2X radio frequency function; determine a processing period required by the V2X device to process the V2X message; determine a waiting period based on the ideal time point and the processing period; transmit, from the application layer module to the underlying layer module, a message transmission request after elapse of the waiting period from acquiring of the ideal time point; and in response to a reception of the message transmission request in the underlying layer module, transmit, using the underlying layer module, the V2X message toward outside at the ideal time point.

In one embodiment, in the transmitting of the message transmission request from the application layer module to the underlying layer module, the processor is configured to control the application layer module to prepare the V2X message and transmit the prepared V2X message to the underlying layer module together with the message transmission request.

In one embodiment, the ideal time point occurs at an expected period set by the application layer module, and in the acquiring of the ideal time point by the application layer module, the processor is configured to: in response to the ideal time point deviating from the expected period, control the underlying layer module to notify the application layer module of a first ideal time point determined after detection of the deviation; and control the application layer module to determine, by calculation, each ideal time point after the first ideal time point until the ideal time point deviates from the expected period again or the expected period is changed by the application layer module.

In one embodiment, the ideal time point occurs at an expected period set by the application layer module, and in the acquiring of the ideal time point by the application layer module, the processor is configured to: in response to the expected period being changed by the application layer module, control the underlying layer module to notify the application layer module of a first ideal time point determined after change of the expected period; and control the application layer module to determine, by calculation, each ideal time point after the first ideal time point until the expected period is changed again by the application layer module or the ideal time point deviates from the expected period.

In one embodiment, the processor is configured to determine the waiting period by a formula M1=(T1−T0)−M2, when M2<T1−T0, M1=(T1−T0)−M2, when M2≥T1−T0, M1=0, wherein M1 represents the waiting period, T1 represents the ideal time point, T0 represents a time point at which the application layer module acquires the ideal time point T1, and M2 represents the processing period.

In one embodiment, the processing period M2 is set to a fixed value.

In one embodiment, the processing period M2 is set to a dynamic value, and in the determining of the processing period M2, the processor is configured to dynamically determine the processing period based on a busy level P1 of the application layer module and a busy level P2 of the underlying layer module.

In one embodiment, the busy level P1 depends on a processing load CPU1 of the application layer module, the busy level P2 depends on a processing load CPU2 of the underlying layer module, in the determining of the processing period M2, the processor is configured to determine the processing period by a formula: M2=(P1(CPU1)+P2(CPU2)+M3), wherein M3 represents a sum of time periods except the busy level P1 of the application layer module and the busy level P2 of the underlying layer module.

In one embodiment, the processing period M2 is set to a dynamic value, and in the determining of the processing period M2, the processor is configured to dynamically determine the processing period M2 based on busy levels of multiple sub-modules of the application layer module and busy levels of multiple sub-modules of the underlying layer module.

In one embodiment, the processor is configured to determine the processing period M2 by a formula: M2=(P11(CPU11)+P12(CPU12)+ . . . +P1N(CPU1N)+P21(CPU21)+P22(CPU22)+ . . . +P2L(CPU2L)+M4), wherein, CPU11, CPU12, . . . CPU1N represent processing loads of corresponding sub-modules of the application layer module, CPU21, CPU22, . . . CPU2L represent processing loads of corresponding sub-modules of the underlying layer module, P11, P12, . . . P1N represent busy levels of corresponding sub-modules of the application layer module, P21, P22, . . . P2L represent busy levels of corresponding sub-modules of the underlying layer module, M4 represent a sum of time periods except the busy levels of the multiple sub-modules of the application layer module and the busy levels of the multiple sub-modules of the underlying layer module, and N and L are integers equal to or greater than 2.

The present disclosure provides a computer-readable storage medium storing a computer program for coordinating a transmission time of a vehicle-to-everything (V2X) message, the computer program comprising instructions executable by a processor to perform the method described above.

In order to make the objectives, technical solutions and advantages of the present disclosure more clearly, the present disclosure will be further described in detail below with reference to specific embodiments and accompanying drawings. In the following detailed description, numerous specific details are set forth in order to provide a thorough understanding of the described exemplary embodiments. However, it will be apparent to the person skilled in the art that the described embodiments may be executed without some or all of these specific details. In other exemplary embodiments, well-known structures have not been described in detail to avoid unnecessarily obscuring the concepts of the present disclosure. It should be understood that the specific embodiments described herein are only used to explain the present disclosure, but not to limit the present disclosure. Meanwhile, various aspects described in the embodiments may be combined arbitrarily under a condition that there is no conflict.

In the existing V2X system, the application layer module transmits a V2X message transmission request to the underlying layer module at a strictly fixed frequency. The application layer module has no information about the resource reservation performed by the underlying layer module. The underlying layer module may receive the message transmission request too early or the message transmission request may miss the reserved resource, thereby causing a transmission delay of V2X message. This may cause an increase or decrease in delay time of the V2X message transmission. Thus, the communication fails to satisfy low latency and high frequency requirement defined under the C-V2X standard, and may further affect the proper operation of C-V2X security application.

The present disclosure provides a method and a device, each of which coordinates the transmission time of V2X message. The application layer module and the underlying layer module coordinate the transmission time of V2X message in order to keep the actual transmission interval of V2X messages in stable manner. Thus, an increase or decrease in delay time of the V2X message transmission can be suppressed, and failure to satisfying low latency and high frequency requirement defined under the C-V2X standard can be avoided.

FIG. 1 is a flowchart showing an example of a method 100 that coordinates a transmission time of V2X message according to the present disclosure.

The method 100 begins at S105. In S105, the application layer module of the V2X device acquires an ideal time point at which the underlying layer module of the V2X device transmits the V2X message toward outside.

In the present disclosure, the application layer module is a module included in the V2X device, and manages the V2X application scenario, for example, the software for managing V2X application scenario. The underlying layer module is a module included in the V2X device, and manages the V2X radio frequency function, for example, the management of software and/or hardware of V2X radio frequency function. In some embodiments, the ideal time point may be a specific time point at which the underlying layer module transmits the message reserved by the SPS.

In some implementations, the application layer module may acquire the ideal time point in different ways. For example, the application layer module may actively request the underlying layer module to inform the ideal time point. In another example, the underlying layer module may actively notify the application layer module of the next ideal time point reserved by the underlying layer module after each reserved ideal time point. In another example, the ideal time point occurs at the expected period of the application layer module. When the reserved ideal time point deviates from the expected period, for example, the next reserved ideal time point no longer advances according to the previously set transmission period due to a change occurred in the V2X network or the like, the underlying layer module may voluntarily notify, to the application layer module, the first reserved ideal time point after occurrence of the deviation, and the application layer module acquires each ideal time point after the first ideal time point by calculation until the ideal time point deviates from the expected period again or the expected period of the application layer module changes.

In another example, the ideal time point is set according to the expected period of the application layer module. When the expected period of the application layer module changes, the underlying layer module voluntarily informs the application layer module of the reserved first ideal time point after the change of expected period. Then, the application layer module acquires each ideal time point after the notified first ideal time point by calculation until the expected period of the application layer module changes again or the ideal time point deviates from the expected period.

For example, assuming that the application layer module needs to broadcast V2X messages with a fixed period of 100 milliseconds (ms). In this case, the expected period of the application layer module is set to 100 ms. The application layer module informs the underlying layer module of the expected period of 100 ms, and the underlying layer module performs resource reservation according to the notified period. The underlying layer module reserves the first ideal time point, and notifies the application layer module of the first ideal time point TS0, which is reserved at the period of 100 ms to transmit the V2X messages toward outside with consideration of the resource reservation condition. As shown in FIG. 1, after the application layer module acquires TS0 in S105, the V2X device continues to perform S110, S115, S120, and S125. The process shown in FIG. 1 is repeatedly executed by the V2X device. After the first ideal time point TS0, the application layer module calculates, in S105, a subsequent ideal time point using a formula T(K)=K*100 ms+TS0, wherein K represents a cumulative count of V2X message transmission after the first ideal time point TS0. That is, each ideal time point after TS0 occurs at the period of 100 ms. After the application layer module acquires each subsequent ideal time point through calculation in S105, the V2X device continues to perform S110, S115, S120, and S125.

After several rounds of V2X message transmission, due to a change in the V2X network, the underlying layer module may detect that the reserved ideal time point does not advance according to the expected period of the application layer module, that is, at the period of 100 ms. When the ideal time point deviates from the expected period, the underlying layer module informs, to the application layer module, the first ideal time point TS1 after the deviation is detected. The first ideal time point TS1 is the time point reserved by the underlying layer module after a change occurs in the V2X network. After the application layer module acquires the first ideal time point TS1 in S105, the V2X device continues to perform S110, S115, S120, and S125. The application layer module calculates a subsequent ideal time point using a formula T(J)=J*100 ms+TS1, wherein J represents a cumulative count of V2X message transmission from the first ideal time point TS1. Each ideal time point after the first ideal time point TS1 successively occurs at the period of 100 ms. After the application layer module acquires each ideal time point by calculation, the V2X device continues to perform S110, S115, S120, and S125.

In some implementations, the expected period at which the application layer module broadcasts V2X messages may be a fixed value, for example, 100 ms. In some implementations, the expected period may change within a range of, for example, from 100 ms to 200 ms. When the expected period changes, the application layer module informs the underlying layer module of the changed expected period (for example, 200 ms), and the underlying layer module reserves channel resource according to the expected period after change. Then, the underlying layer module informs the application layer module of the newly reserved ideal time point TS0'. After the application layer module acquires TS0' in S105, the V2X device continues to perform S110, S115, S120, and S125, and the application layer module calculates a subsequent ideal time point using a formula T(H)=H*200 ms+TS0' based on the ideal time point TS0' after change and the expected period of 200 ms after change. Herein, H represents a cumulative count of V2X message transmission after the time point TS0'. The ideal time point after TS0' continues to appear at the period of 200 ms until the expected period of the application layer module changes again or the underlying layer module detects that the reserved ideal time point deviates from the expected period. After the application layer module acquires each ideal time point through calculation in S105, the V2X device continues to perform S110, S115, S120, and S125.

As shown in FIG. 1, in S110, a processing period required by the V2X device to process the V2X message is determined. Specifically, the processing period represents a period of time required for the V2X device to prepare and process the V2X message for transmission toward outside. For example, the processing period includes a time period required by the application layer module to prepare the V2X message, a time period required by the operating system of the V2X device for scheduling transmission of the V2X message, a time period required for transmitting a message transmission request from the application layer module to the underlying layer module, and a time period required by the underlying layer module to process the message transmission request. In order to successfully transmit the V2X message, the processing period should be equal to or longer than a sum of the above-described time periods with a certain margin.

In S115, a waiting period is determined based on the ideal time point and the processing period.

Specifically, the waiting period may be determined using the following formula: M1=(T1−T0)−M2. When M2<T1−T0, M1=(T1−T0)−M2. When M2≥T1−T0, M1=0. Here, M1 represents the waiting period, T1 represents the ideal time point, T0 represents the time point at which the application layer module acquires the ideal time point T1, and M2 represents the processing period.

In some implementations, the processing period M2 may be set to a fixed value. For example, the processing period M2 may be set to 30 ms according to actual measurement experience. The value of processing period M2 covers all of the necessary time periods in 99.9% of cases.

In some implementations, the processing period M2 may be set to a dynamic value, and may be dynamically determined based on a busy level of the application layer module and a busy level of the underlying layer module.

In some implementations, the processing period M2 may be set to a dynamic value and may be dynamically determined based on busy levels of multiple sub-modules of the application layer module and busy levels of multiple sub-modules of the underlying layer module.

Figure 2:
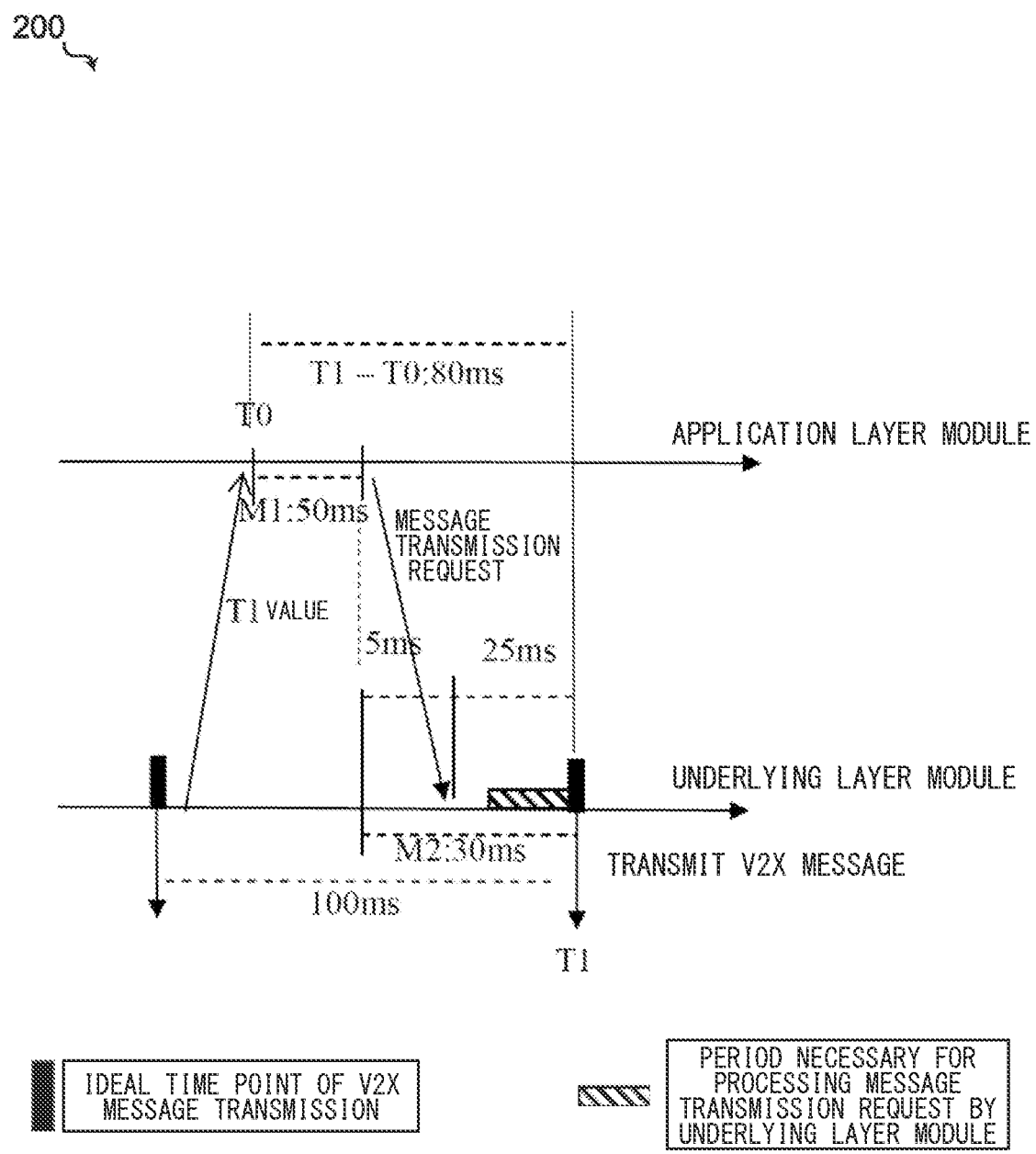
FIG. 2 is a diagram showing a scenario using the method of coordinating the transmission time of V2X message according to the present disclosure.
Figure 3:
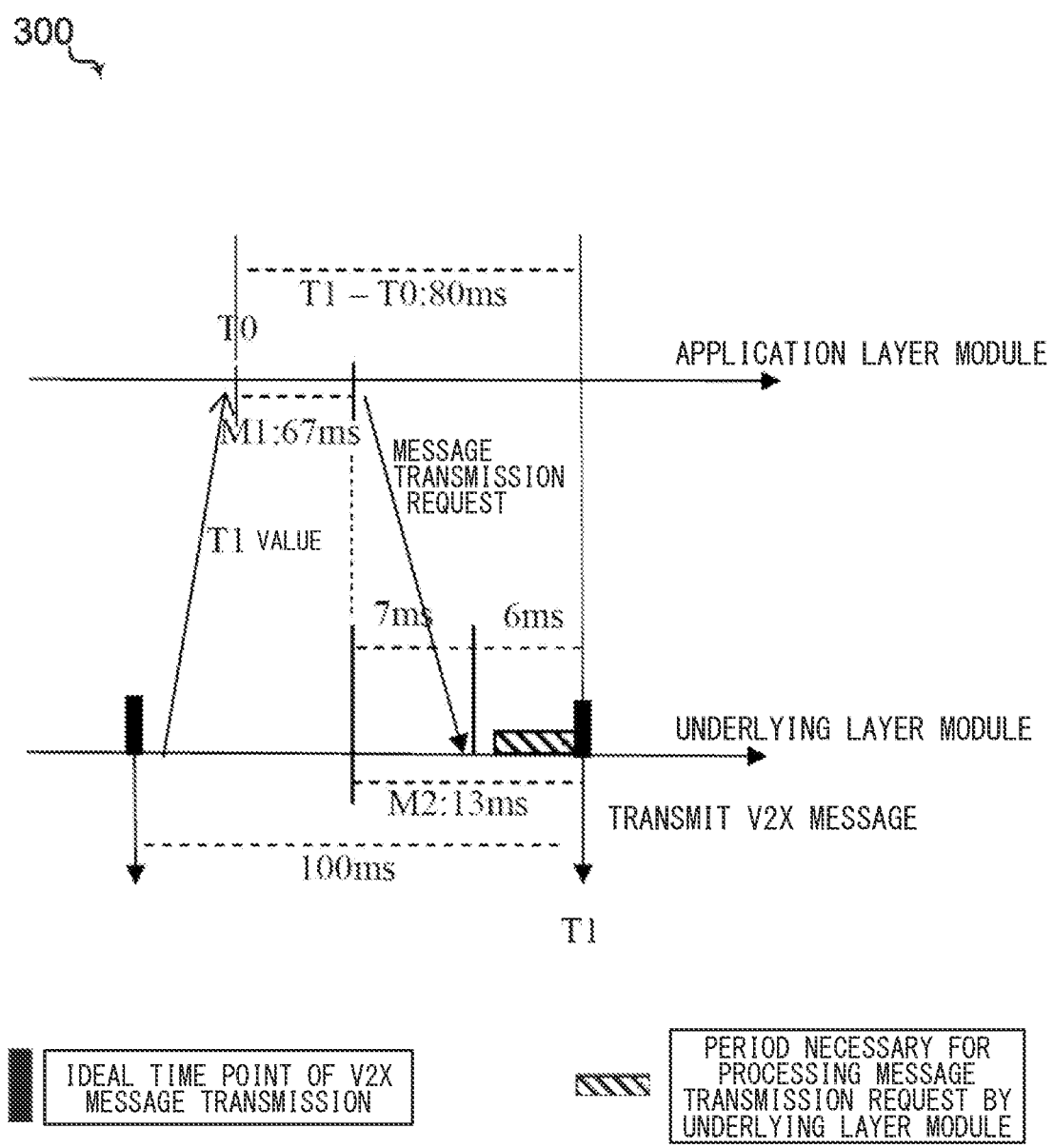
FIG. 3 is a diagram showing another scenario using the method of coordinating the transmission time of V2X message according to the present disclosure.

The following will describe specific calculation examples of the processing period M2 and the waiting period M1 with reference to FIG. 2 and FIG. 3.

In S120, the application layer module transmits the message transmission request to the underlying layer module in response to an elapse of the waiting period from the acquirement of ideal time point. Specifically, the application layer module may use a timer, which is set to expire in response to the elapse of waiting period. When the timer expires, the application layer module is triggered to transmit the message transmission request to the underlying layer module. In S115, in a case where the determined waiting period M1=0, the application layer module immediately transmits the message transmission request to the underlying layer module without setting the timer.

In one embodiment, the application layer module may collect the V2X message from other sources. For example, the application layer module may collect, using GPS system or in-vehicle network such as CAN, the position of own vehicle, the speed of own vehicle, the yaw angle of own vehicle, and store the collected data in the application layer module. In such an embodiment, the application layer module may start preparing of the V2X message (for example, preparing package data required for the V2X message) after elapse of the waiting period, and then transmit the prepared V2X message to the underlying layer module together with the message transmission request. In another embodiment, the V2X message may be collected by a different module (for example, a collection unit disposed outside the application layer module), and the collected V2X message may be transmitted to the underlying layer module.

In S125, the underlying layer module transmits the V2X message at the ideal time point in response to the received message transmission request. Specifically, after receiving the message transmission request, the underlying layer module processes the message transmission request and prepares for the message transmission before arrival of ideal time point, and then transmits the V2X message at the ideal time point toward outside, such as other vehicles, roadside device, or the like.

In the method 100, by the coordination between the application layer module and the underlying layer module, the application layer module can transmit the message transmission request to the underlying layer module at an appropriate time, thereby reducing the problem of transmission delay caused by asynchronous transmission between the application layer module and the underlying layer module in the V2X device. Thus, the actual transmission interval of V2X messages can be stabilized, and the reliability and real-time performance of V2X messages can be improved. This configuration ensures proper operation of safety applications, thereby improving vehicle safety performance.

In order to better understand the method of coordinating the transmission time point of V2X message according to the present disclosure, exemplary scenarios using the method of the present disclosure will be described with reference to FIG. 2 and FIG. 3.

FIG. 2 is a diagram showing a scenario 200 using the method of coordinating transmission time of V2X message according to the present disclosure.

In the scenario 200, it is assumed that the application layer module is configured to broadcast the V2X messages at the fixed period of 100 ms. In this scenario, the application layer module and the underlying layer module may coordinate the transmission time point of V2X messages through the following steps.

(1) Initialize each module in the V2X device. The application layer module informs the underlying layer module of the period of 100 ms, and the underlying layer module performs V2X resource reservation according to the informed transmission period.

(2) Perform time synchronization between the application layer module and the underlying layer module. Specifically, the application layer module and the underlying layer module perform time synchronization in software manner or hardware manner. For example, a time synchronization module may receive GNSS signals and transmit time synchronization information to both of the application layer module and the underlying layer module for synchronize the application layer module with the underlying layer module, for example, with an allowable error of less than 1 ms.

(3) The application layer module acquires the ideal time point (T1 in FIG. 2) at which the underlying layer module schedules to transmit the V2X message toward outside. For example, the underlying layer module may notify the application layer module of the V2X message transmission time point, which is set at the period of 100 ms and reserved by the underlying layer module according to the V2X resource reservation condition.

(4) The application layer module transmits the message transmission request to the underlying layer module after elapse of the waiting period from the acquirement of ideal time point. The waiting period is calculated as follows.

$$M1=(T1-T0)-M2$$

When M2<T1−T0, M1=(T1−T0)−M2.
When M2≥T1−T0, M1=0.

Herein, M1 represents the waiting period, T1 represents the ideal time point, T0 represents the time point at which the application layer module acquires the ideal time point T1 from the underlying layer module, and M2 represents the processing period required by the V2X device to process the V2X message.

As shown in FIG. 2, T1−T0=80 ms, and the processing period M2 is set to a fixed value of 30 ms.

Thus, the waiting period M1=80 ms−30 ms=50 ms.

Therefore, in the scenario 200, the application layer module transmits the message transmission request to the underlying layer module after elapse of 50 ms from the time point T0.

In a case where the V2X message is collected by the application layer module, the application layer module may start preparing of the V2X message after elapse of the waiting period M1. The preparing of V2X message may include packing the data required by the V2X message, for example, packing the collected data, such as the position of own vehicle, the speed of own vehicle, the yaw angle of own vehicle and other data as BSM data packets. Then, the application layer module transmits the prepared V2X message to the underlying layer module together with the message transmission request.

(5) The underlying layer module receives the message transmission request from the application layer module, and prepares for transmission of the message before arrival of ideal time point. Specifically, as shown in FIG. 2, the underlying layer module receives the message transmission request after 5 ms from the transmission of message transmission request, and prepares for the message transmission within remaining 25 ms. As shown in FIG. 2, the remaining time period of 25 ms is longer than the time period required by the underlying layer module to process the message transmission request (the block with hatching shown in FIG. 2) to provide a certain margin.

(6) At the ideal time point T1, the underlying layer module broadcasts the V2X message on time toward outside, such as other vehicles, roadside device, or the like included in the V2X system.

FIG. 3 is a diagram showing another scenario 300 using the method of coordinating the transmission time of V2X message according to the present disclosure.

In the scenario 300, it is assumed that the application layer module is configured to broadcast the V2X messages at the fixed period of 100 ms. In this scenario, the application layer module and the underlying layer module may coordinate the transmission time point of V2X messages through the following steps.

(1) Initialize each module in the V2X device. The application layer module informs the underlying layer module of the transmission period of 100 ms, and the underlying layer module performs V2X resource reservation according to the informed transmission period.

(2) Perform time synchronization between the application layer module and the underlying layer module. Specifically, the application layer module and the underlying layer module perform synchronization in software manner or hardware manner. For example, a time synchronization module may receive GNSS signals and transmit time synchronization information to both of the application layer module and the underlying layer module to synchronize the application layer module with the underlying layer module, for example, with an allowable error of less than 1 ms.

(3) The application layer module acquires the ideal time point (T1 in FIG. 3) at which the underlying layer module schedules to transmit the V2X message toward outside. For example, the underlying layer module may notify the application layer module of the V2X message transmission time, which is set at the period of 100 ms and reserved by the underlying layer module according to the V2X resource reservation condition.

(4) The application layer module transmits the message transmission request to the underlying layer module after elapse of the waiting period from the acquirement of the ideal time point. The waiting period is calculated as follows.

$$M1=(T1-T0)-M2$$

When M2<T1−T0, M1=(T1−T0)−M2.
When M2≥T1−T0, M1=0.

Herein, M1 represents the waiting period, T1 represents the ideal time point, T0 represents the time point at which the application layer module acquires the ideal time point T1 from the underlying layer module, and M2 represents the processing period required by the V2X device to process the V2X message.

As shown in FIG. 3, T1−T0=80 ms.

Different from the scenario 200, in the scenario 300, M2 is set to a dynamic value and the value of M2 is set with consideration of the processing load of the system. Specifically, M2 is calculated by the following formula.

$$M2=(P1(CPU1)+P2(CPU2)+M3)$$

Herein, CPU1 represents a processing load of the application layer module, CPU2 represents a processing load of the underlying layer module, P1(CPU1) represents a busy level related to the processing load of the application layer module, P2(CPU2) represents a busy level related to the processing load of the underlying layer module, and M3 represents a total time period consumed except the time periods related to the busy level P1 of the application layer module and the busy level P2 of the underlying layer module. For example, M3 may include a time period required for the transmission of message transmission request from the application layer module to the underlying layer module, other time periods consumed in the system, and the like.

The application layer module may acquire, by inquiring, that the processing load CPU1 of the application layer module is 32%, and the processing load CPU2 of the underlying layer module is 68%. M3 is empirically set to be 5 ms. Thus, M2=(P1(32%)+P2(68%)+5 ms).

In the scenario 300, a delay function is used to set the busy level of each module. Specifically, the delay function includes a table indicating relationship between the processing load and the delay time. After receiving the processing load as an input, the delay function looks up the closest load value in the table indicating relationship between the processing load and delay time, and specifies the corresponding time delay value as an output.

An example of the load-delay relationship table included in the delay function P1 of the application layer module is shown in Table 1 as below.

TABLE 1

| Processing Load | Delay |
|---|---|
| 0% | 1 ms |
| 10% | 1.5 ms |
| . . . | . . . |
| 30% | 2 ms |
| 40% | 3 ms |
| . . . | . . . |

An example of the load-delay relationship table included in the delay function P2 of the underlying layer module is shown in Table 2 as below.

TABLE 2

| Processing Load | Delay |
|---|---|
| 0% | 1 ms |
| 10% | 0.5 ms |
| . . . | . . . |
| 65% | 4 ms |
| 70% | 6 ms |
| . . . | . . . |

According to the above-described load-delay relationship table, P1(32%)=2 ms and P2(68%)=6 ms.

Thus, the processing period M2=(P1(32%)+P2(68%)+5 ms)=(2 ms+6 ms+5 ms)=13 ms, and the waiting period M1=80 ms−13 ms=67 ms.

Therefore, in the scenario 300, the application layer module transmits the message transmission request to the underlying layer module after elapse of 67 ms from the time point T0.

In a case where the V2X message is collected by the application layer module, the application layer may start preparing of the V2X message, such as packing the data required by the V2X message after elapse of the waiting period M1, and then transmits the prepared V2X message together with the message transmission request to the underlying layer module.

It should be noted that the processing load of application layer module and the processing load of underlying layer module may be measured at intervals. Alternatively, the processing load of application layer module and the processing load of underlying layer module may be set as fixed values. For example, values measured at the factory or values obtained through theoretical calculation may be set as the fixed values. The time period M3 may be set to a fixed value, such as a measured value at the factory or a value obtained by theoretical calculation.

(5) The underlying layer module receives the message transmission request from the application layer module, and prepares for the transmission of message before arrival of ideal time point. As shown in FIG. 3, the underlying layer module receives the message transmission request after 7 ms, that is, the time period required for transmission of the message transmission request from the application layer module to the underlying layer module is 7 ms. Then, the underlying layer module prepares for transmission of the message within 6 ms. As shown in FIG. 3, the remaining time period of 6 ms is longer than the time period required by the underlying layer module to process the message transmission request (the block with hatching shown in FIG. 3) to provide a certain margin.

(6) At the ideal time point T1, the underlying layer module broadcasts the V2X message on time toward outside, such as other vehicles, roadside device, or the like included in the V2X system.

It should be noted that FIG. 2 and FIG. 3 are only exemplary scenarios, and the present disclosure is not limited to these examples. Although FIG. 2 and FIG. 3 show specific steps, steps may be added, deleted, or combined different from the shown examples in an actual implementation. FIG. 3 shows that the processing period M2 is determined based on the busy levels of the application layer module and the underlying layer module in the V2X device. In another example, the processing period M2 may be determined based on the busy levels of multiple sub-modules of the application layer module and the busy levels of multiple sub-modules of the underlying layer module.

Figure 4:
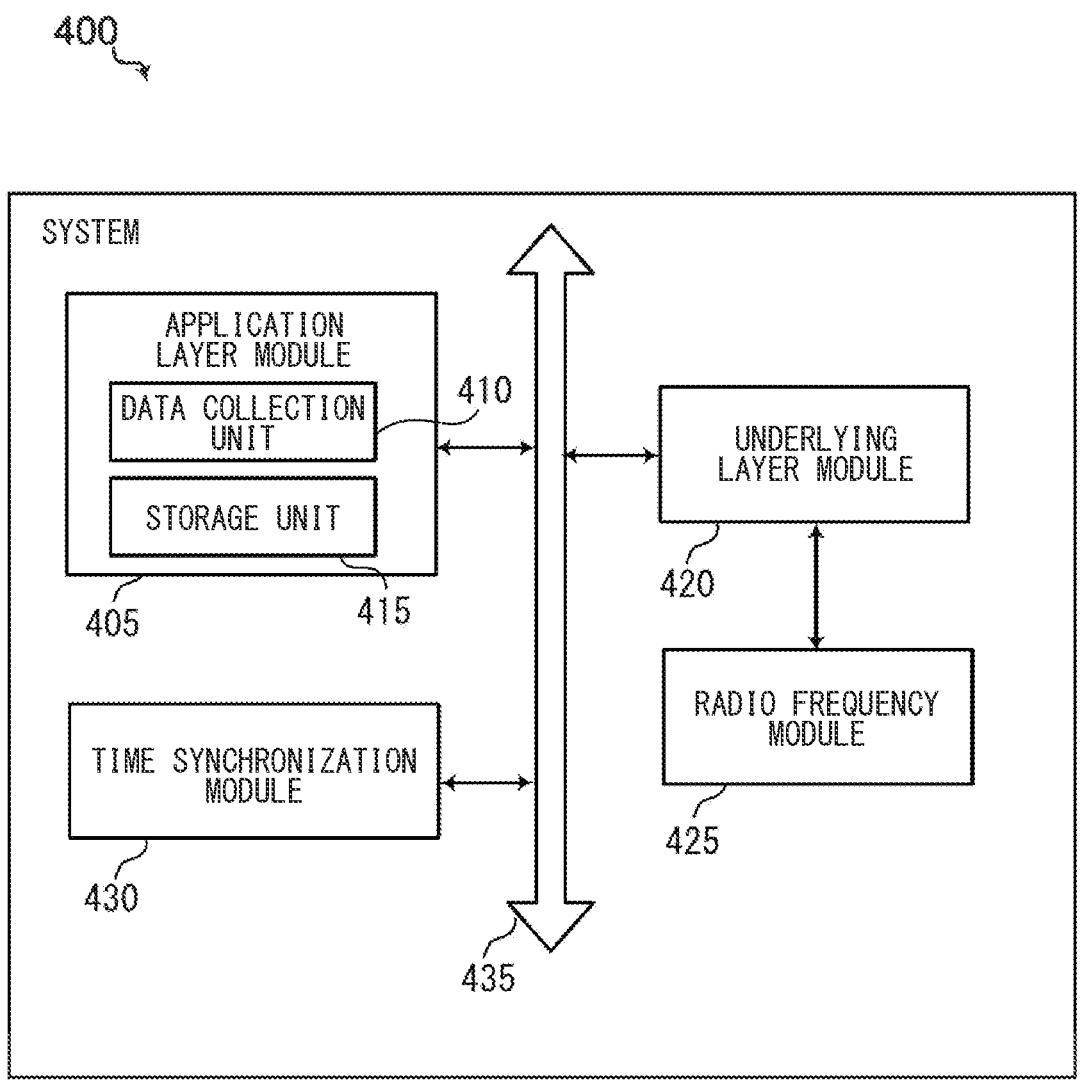
FIG. 4 is a block diagram showing a configuration of a system that coordinates the transmission time of V2X message according to the present disclosure.

FIG. 4 is a block diagram showing a configuration of a system 400 for coordinating the transmission time of V2X message according to the present disclosure.

As shown in FIG. 4, the system 400 includes an application layer module 405, an underlying layer module 420, a radio frequency module 425, and a time synchronization module 430. As shown in FIG. 4, the application layer module 405, the underlying layer module 420, the time synchronization module 430 may directly or indirectly connect or communicate with one another through one or more buses 435. The radio frequency module 425 is connected with the underlying layer module 420, and the radio frequency module 425 and the underlying layer module 420 communicate with one another. For example, the radio frequency module 425 may be implemented by a wireless communication transceiver or the like.

In an embodiment of the present disclosure, the application layer module 405 may be configured to: acquire an ideal time point at which the underlying layer module schedules to transmit the V2X message toward outside; determine the processing period required by the V2X device to process the V2X message; determine the waiting period based on the ideal time point and the processing period; and transmit the message transmission request to the underlying layer module after elapse of the waiting period from the acquirement of ideal time point. In one embodiment, the application layer module 405 may be configured to start preparing of the V2X message after elapse of the waiting period from the acquirement of the ideal time point, and transmit the prepared V2X message to the underlying layer module together with the message transmission request. In one embodiment, in a case where the ideal time point appears according to the expected period of the application layer module, in response to detection of a deviation of ideal time point from the expected period by the underlying layer module, the application layer module 405 may be configured to calculate the subsequent ideal time point after acquiring the first ideal time point, which is reset in response to the detection of deviation, until the ideal time point deviates from the expected period again or the expected period is changed. In one embodiment, in a case where the expected period of the application layer module changes, the application layer module 405 may be configured to calculate the subsequent ideal time point after acquiring the first ideal time point, which is reset in response to the change occurred in the expected period, until a change occurs again in the expected period or the ideal time point deviates from the expected period.

As shown in FIG. 4, the application layer module 405 may include a data collection unit 410 configured to collect data of V2X message. For example, the data collection unit 410 may collect, from the GPS system, the in-vehicle CAN, or the like, data such as the position of own vehicle, the speed of own vehicle, the yaw angle of own vehicle, or the like. The application layer module 405 may further include a storage unit 415 to store the data collected by the data collection unit 410.

The underlying layer module 420 may be configured to: inform the application layer module of the reserved next ideal time point after each reserved ideal time point has passed; in response to the reserved ideal time point deviating from the expected period of the application layer module, notify the application layer module of the first ideal time point after deviation; in response to a change of the expected period set in the application layer module, notify the application layer module of the first ideal time point after the change of expected period; and transmit the V2X message toward outside at the ideal time point in response to the reception of the message transmission request.

The radio frequency module 425 is configured to transmit and receive radio frequency signals and process the radio frequency signals.

The time synchronization module 430 is configured to perform time synchronization between the application layer module 405 and the underlying layer module 420.

FIG. 4 shows specific modules and units of the system 400. It should be understood that these modules and units are exemplary configuration, and the present disclosure is not limited to this configuration. In different implementations, one or more of these modules or units may be combined, split, removed, or additional modules or units may be added. For example, in one implementation, the data collection unit 410 may be combined with the storage unit 415 as one unit. In another implementation, the data collection unit 410 and/or the storage unit 415 may be disposed outside of the application layer module 405.

Figure 5:
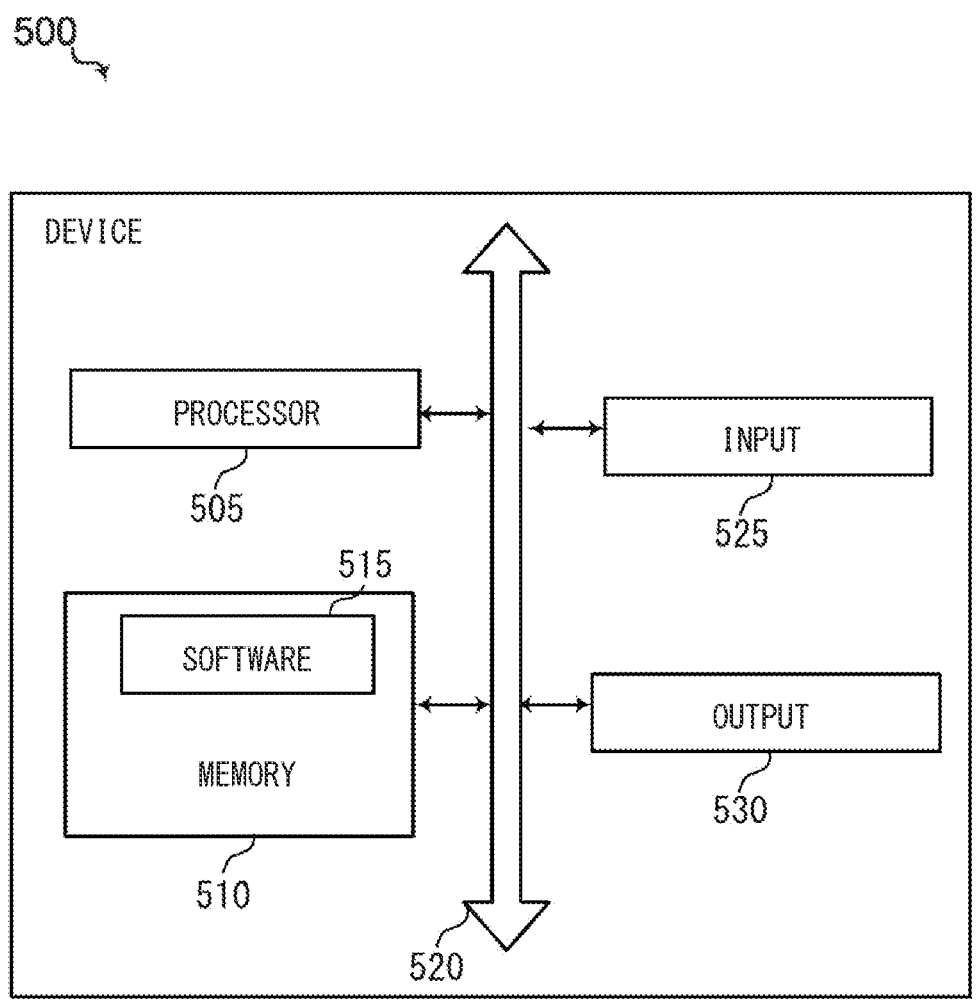
FIG. 5 is a block diagram showing a configuration of a system device that coordinates the transmission time of V2X message according to the present disclosure.

FIG. 5 is a block diagram showing a configuration of a system device 500 for coordinating the transmission time of V2X message according to the present disclosure.

The device illustrates a general hardware environment in which the present disclosure may be applied in accordance with exemplary embodiments of the present disclosure.

The following will describe the device 500 with reference to FIG. 5, which is an exemplary embodiment of a hardware device that may be applied to various aspects of the present disclosure.

The device 500 may include components that are able to connect or communicate with a bus 520 via one or more interfaces. For example, the device 500 may include a bus 520, a processor 505, a memory 510, an input device 525, and an output device 530.

The processor 505 may be any type of processor. The processor 505 may be configured to manage the bus and perform general processing, including executing software stored in the memory. The processor 505 may also be configured to perform various functions related to coordination of the transmission time of V2X message as described in the present disclosure. For example, the processor 505 may be configured to: control the application layer module of the V2X device to acquire an ideal time point at which the underlying layer module of the V2X device schedules to transmit the V2X message toward outside, wherein the application layer module is configured to manage the V2X application scenario and the underlying layer module is configured to manage the V2X radio frequency function; determine the processing period required by the V2X device to process the V2X message; determine the waiting period based on the ideal time point and the processing period; control the application layer module to transmit the message transmission request to the underlying layer module after elapse of the waiting period from the acquirement of the ideal time point; and control the underlying layer module to transmit the V2X message at the ideal time point in response to the reception of message transmission request.

The memory 510 may be any kind of computer-readable non-transitory tangible storage medium that is configured to store data. The memory 510 may store computer-executable software 515 comprising computer-readable instructions that, when executed, cause the processor to perform various functions related to coordinating the transmission time of V2X message as described in the present disclosure.

The input device 525 may be any type of device that is configured to input information.

The output device 530 may be any type of device for outputting information. In an example, the output device 530 may be provided by a device that displays information.

The detailed description set forth above in connection with the accompanying drawings describes examples of the present disclosure, but does not represent all examples that may be implemented or that fall within the scope of the claims. The terms "example" and "exemplary" as used in this specification indicate "serving as an example, instance, or illustration" and do not indicate "advantageous or advantageous over other examples."

In the present disclosure, the terms "one embodiment" or "an embodiment" indicate that a particular feature, structure, or characteristic described in connection with the embodiment is included in at least one embodiment of the present disclosure. Thus, use of these terms may refer to more than one embodiment. Furthermore, the described features, structures or characteristics may be combined in any suitable manner in one or more embodiments.

The description in the present disclosure is provided to enable a person skilled in the art to practice the various aspects of the present disclosure described herein. Various modifications of these aspects will be readily apparent to those skilled in the art, and the general principles defined herein may be applied to other aspects. Thus, the claims are not limited to the aspects described in the present disclosure, but also include all possible scope consistent with the claims linguistically. In the claims, reference to elements in the singular form should not be interpreted as "only one", but should be interpreted as "one or more" unless there is special statement regarding the singular or multiple form. Unless specifically stated otherwise, the term "some" refers to one or more. Elements of the various aspects described in the present disclosure are all structural and functional equivalents now or hereafter known to the person skilled in the art, and the various aspects are expressly incorporated herein by reference and are intended to be encompassed by the claims.

It should also be noted that the embodiments may be described as processes depicted as flowcharts, flow diagrams, block diagrams, or block diagrams. Although a flowchart may describe the operations as a sequential process, many of these operations can be performed in parallel or concurrently. Additionally, the order of operations may be rearranged.

While various embodiments have been illustrated and described, it should be understood that the embodiments are not limited to the precise arrangements and components described in the present disclosure. Various modifications, substitutions and improvements apparent to those skilled in the art may be made in the arrangement, operation and details of the device disclosed herein without departing from the scope of the claims.

What is claimed is:

1. A method of coordinating a transmission time of a vehicle-to-everything (V2X) message, the method being executed by a V2X device which includes a processor, a non-transitory storage medium storing a software program, an input interface, an output interface, and a bus, the method comprising:
   acquiring, by an application layer module implemented by the processor of the V2X device, an ideal time point at which an underlying layer module of the V2X device schedules to transmit the V2X message toward outside, the application layer module being configured to manage a V2X application scenario and the underlying layer module being configured to manage a V2X radio frequency function, the underlying layer module of the V2X device being implemented by the processor of the V2X device;
   determining, with the processor of the V2X device, a processing period required by the V2X device to process the V2X message;
   determining, with the processor of the V2X device, a waiting period based on the ideal time point and the processing period;
   transmitting, from the application layer module to the underlying layer module, a message transmission request after elapse of the waiting period from acquiring of the ideal time point; and
   in response to a reception of the message transmission request in the underlying layer module, transmitting, using the underlying layer module, the V2X message toward outside at the ideal time point.

2. The method according to claim 1, wherein, in the transmitting of the message transmission request from the application layer module to the underlying layer module, the application layer module prepares the V2X message and transmits the prepared V2X message to the underlying layer module together with the message transmission request.

3. The method according to claim 1, wherein the ideal time point occurs at an expected period set by the application layer module, and
   in the acquiring of the ideal time point by the application layer module:
      in response to the ideal time point deviating from the expected period, the underlying layer module notifies the application layer module of a first ideal time point determined after detection of the deviation; and
      the application layer module determines, by calculation, each ideal time point after the first ideal time point until the ideal time point deviates from the expected period again or the expected period is changed by the application layer module.

4. The method according to claim 1, wherein the ideal time point occurs at an expected period set by the application layer module, and
   in the acquiring of the ideal time point by the application layer module:
      in response to the expected period being changed by the application layer module, the underlying layer module notifies the application layer module of a first ideal time point determined after change of the expected period; and the application layer module determines, by calculation, each ideal time point after the first ideal time point until the expected period is changed again by the application layer module or the ideal time point deviates from the expected period.

5. The method according to claim 1, wherein
the waiting period M1 is determined by a formula M1=(T1−T0)−M2,
when M2<T1−T0, M1=(T1−T0)−M2,
when M2≥T1−T0, M1=0,
wherein M1 represents the waiting period, T1 represents the ideal time point, T0 represents a time point at which the application layer module acquires the ideal time point T1, and M2 represents the processing period.

6. The method according to claim 5, wherein
the processing period M2 is set to a fixed value.

7. The method according to claim 5, wherein
the processing period M2 is set to a dynamic value, and
the determining of the processing period M2 includes dynamically determining the processing period based on a busy level P1 of the application layer module and a busy level P2 of the underlying layer module.

8. The method according to claim 7, wherein
the busy level P1 depends on a processing load CPU1 of the application layer module,
the busy level P2 depends on a processing load CPU2 of the underlying layer module, and
the processing period M2 is determined by a formula:

$$M2=(P1(CPU1)+P2(CPU2)+M3),$$

wherein M3 represents a sum of time periods except the busy level P1 of the application layer module and the busy level P2 of the underlying layer module.

9. The method according to claim 5, wherein
the processing period M2 is set to a dynamic value, and
the determining of the processing period M2 includes dynamically determining the processing period M2 based on busy levels of multiple sub-modules of the application layer module and busy levels of multiple sub-modules of the underlying layer module,
the multiple sub-modules of the application layer module and the multiple sub-modules of the underlying layer module are implemented by the processor of the V2X device.

10. The method according to claim 9, wherein
the processing period M2 is determined by a formula:

$$M2=(P11(CPU11)+P12(CPU12)+\ldots+P1N(CPU1N)+P21(CPU21)+P22(CPU22)+\ldots+P2L(CPU2L)+M4),$$

wherein,
CPU11, CPU12, . . . . CPU1N represent processing loads of corresponding sub-modules of the application layer module,
CPU21, CPU22, . . . . CPU2L represent processing loads of corresponding sub-modules of the underlying layer module,
P11, P12, . . . . P1N represent busy levels of corresponding sub-modules of the application layer module,
P21, P22, . . . . P2L represent busy levels of corresponding sub-modules of the underlying layer module,
M4 represent a sum of time periods except the busy levels of the multiple sub-modules of the application layer module and the busy levels of the multiple sub-modules of the underlying layer module, and
N and L are integers equal to or greater than 2.

11. A vehicle-to-everything (V2X) device of coordinating a transmission time of a V2X message, the V2X device comprising:
a non-transitory storage medium storing a software program; and
a processor coupled to the non-transitory storage medium, the processor, by executing the software program stored in the non-transitory storage medium, being configured to:
acquire, by an application layer module of the V2X device, an ideal time point at which an underlying layer module of the V2X device schedules to transmit the V2X message toward outside, the application layer module being configured to manage a V2X application scenario and the underlying layer module being configured to manage a V2X radio frequency function, the application layer module of the V2X device and the underlying layer module of the V2X device being implemented by the processor of the V2X device;
determine a processing period required by the V2X device to process the V2X message;
determine a waiting period based on the ideal time point and the processing period;
transmit, from the application layer module to the underlying layer module, a message transmission request after elapse of the waiting period from acquiring of the ideal time point; and
in response to a reception of the message transmission request in the underlying layer module, transmit, using the underlying layer module, the V2X message toward outside at the ideal time point.

12. The device according to claim 11, wherein,
in the transmitting of the message transmission request from the application layer module to the underlying layer module, the processor is configured to control the application layer module to prepare the V2X message and transmit the prepared V2X message to the underlying layer module together with the message transmission request.

13. The device according to claim 11, wherein
the ideal time point occurs at an expected period set by the application layer module, and
in the acquiring of the ideal time point by the application layer module, the processor is configured to:
in response to the ideal time point deviating from the expected period, control the underlying layer module to notify the application layer module of a first ideal time point determined after detection of the deviation; and
control the application layer module to determine, by calculation, each ideal time point after the first ideal time point until the ideal time point deviates from the expected period again or the expected period is changed by the application layer module.

14. The device according to claim 11, wherein
the ideal time point occurs at an expected period set by the application layer module, and
in the acquiring of the ideal time point by the application layer module, the processor is configured to:
in response to the expected period being changed by the application layer module, control the underlying layer module to notify the application layer module of a first ideal time point determined after change of the expected period; and
control the application layer module to determine, by calculation, each ideal time point after the first ideal time point until the expected period is changed again by the application layer module or the ideal time point deviates from the expected period.

15. The device according to claim 11, wherein
the processor is configured to determine the waiting period by a formula $$M1=(T1-T0)-M2,$$

when M2<T1−T0, M1=(T1−T0)−M2,
when M2≥T1−T0, M1=0,
wherein M1 represents the waiting period, T1 represents the ideal time point, T0 represents a time point at which the application layer module acquires the ideal time point T1, and M2 represents the processing period.

16. The device according to claim 15, wherein
the processing period M2 is set to a fixed value.

17. The device according to claim 15, wherein
the processing period M2 is set to a dynamic value, and
in the determining of the processing period M2, the processor is configured to dynamically determine the processing period based on a busy level P1 of the application layer module and a busy level P2 of the underlying layer module.

18. The device according to claim 17, wherein
the busy level P1 depends on a processing load CPU1 of the application layer module,
the busy level P2 depends on a processing load CPU2 of the underlying layer module,
in the determining of the processing period M2, the processor is configured to determine the processing period by a formula:

$$M2=(P1(CPU1)+P2(CPU2)+M3),$$

wherein M3 represents a sum of time periods except the busy level P1 of the application layer module and the busy level P2 of the underlying layer module.

19. The device according to claim 15, wherein
the processing period M2 is set to a dynamic value, and
in the determining of the processing period M2, the processor is configured to dynamically determine the processing period M2 based on busy levels of multiple sub-modules of the application layer module and busy levels of multiple sub-modules of the underlying layer module,
the multiple sub-modules of the application layer module and the multiple sub-modules of the underlying layer module are implemented by the processor of the V2X device.

20. The device according to claim 19, wherein
the processor is configured to determine the processing period M2 by a formula:

$$M2=(P11(CPU11)+P12(CPU12)+\ldots+P1N(CPU1N)+P21(CPU21)+P22(CPU22)+\ldots+P2L(CPU2L)+M4)$$

wherein,
CPU11, CPU12, . . . . CPU1N represent processing loads of corresponding sub-modules of the application layer module,
CPU21, CPU22, . . . . CPU2L represent processing loads of corresponding sub-modules of the underlying layer module,
P11, P12, . . . . P1N represent busy levels of corresponding sub-modules of the application layer module,
P21, P22, . . . . P2L represent busy levels of corresponding sub-modules of the underlying layer module,
M4 represent a sum of time periods except the busy levels of the multiple sub-modules of the application layer module and the busy levels of the multiple sub-modules of the underlying layer module, and
N and L are integers equal to or greater than 2.

21. A computer-readable non-transitory tangible storage medium storing a computer program for coordinating a transmission time of the V2X message, the computer program comprising instructions executable by the processor to perform the method according to claim 1.

\* \* \* \* \*